(12) United States Patent
Tare et al.

(10) Patent No.: US 6,994,164 B2
(45) Date of Patent: *Feb. 7, 2006

(54) METHOD FOR ENHANCING THE STABILITY OF A WATER SENSITIVE, REACTIVE SUBTERRANEAN FORMATION

(75) Inventors: Uday A. Tare, Houston, TX (US); James F. Heathman, Houston, TX (US); Krishna M. Ravi, Kingwood, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 191 days.

This patent is subject to a terminal disclaimer.

(21) Appl. No.: 10/956,941

(22) Filed: Oct. 1, 2004

(65) Prior Publication Data

US 2005/0039920 A1 Feb. 24, 2005

Related U.S. Application Data (62) Division of application No. 10/298,251, filed on Nov. 15, 2002.

(51) Int. Cl.
*E21B 33/13* (2006.01)

(52) U.S. Cl. .................. 166/250.14; 166/292; 166/264
(58) Field of Classification Search ............ 166/250.14, 166/292, 293, 264; 73/152.07, 152.51
See application file for complete search history.

(56) References Cited

U.S. PATENT DOCUMENTS

| | | | |
|---|---|---|---|
| 3,301,323 A | 1/1967 | Parsons | 175/66 |
| 3,646,997 A | 3/1972 | Chenevert | 166/250 |

(Continued)

FOREIGN PATENT DOCUMENTS

| | | |
|---|---|---|
| WO | WO 02/053873 | 7/2002 |

OTHER PUBLICATIONS

SPE/IADC 79913 entitled "Understanding Formation (In) Stability During Cementing" by James Heathman et al., dated Feb. 2003.

IADC/SPE 77192 entitled "Novel High Membrane Efficiency Water–Based Drilling Fluids For Alleviating Problems in Troublesome Shale Formations" by Chee T. Tan et al., dated Sep. 2002.

SPE/ISRM 78159 entitled "Development and Laboratory Verification of High Membrane Efficiency Water–Based Drilling Fluids with Oil–Based Drilling Fluid–Like Performance in Shale Stabilization" by C.P. Tan et al., dated Oct. 2002.

OTC 14267 entitled "Mitigating Wellbore Stability Problems while Drilling With Water–Based Muds In Deepwater Environments" by U.A. Tare et al., dated May 2002.

SPE 77447 entitled "Development of Novel Membrane Efficient Water–Based Drilling Fluids Through Fundamental Understanding of Osmotic Membrane Generation in Shales" by Fersheed Mody et al., dated Oct. 2002.

*Primary Examiner*—John Kreck
(74) *Attorney, Agent, or Firm*—Craig W. Roddy; McAfee & Taft, P.C.

(57) ABSTRACT

The current invention provides a method for enhancing the formation stability of water sensitive, reactive formations penetrated by a wellbore. The method of the current invention provides an accurate evaluation of the impact of cementing fluids on water sensitive, reactive formations and provides the ability to accurately formulate cementing fluids in order to enhance the stability of such formations. When necessary, the method of the current invention additionally provides for the application of an osmotic semi-permeable membrane to the face of the formation.

21 Claims, 6 Drawing Sheets

U.S. PATENT DOCUMENTS

| | | | |
|---|---|---|---|
| 4,751,966 A | 6/1988 | Jones | 166/299 |
| 4,889,819 A | 12/1989 | Davari et al. | 437/27 |
| 4,899,819 A | 2/1990 | Hazlett et al. | 166/285 |
| 5,134,118 A | 7/1992 | Patel et al. | 507/121 |
| 5,168,928 A | 12/1992 | Terry et al. | 166/292 |
| 5,370,185 A | 12/1994 | Cowan et al. | 166/293 |
| 5,663,121 A | 9/1997 | Moody | 507/102 |
| 5,698,772 A | 12/1997 | Deruyter et al. | 73/38 |
| 5,806,592 A * | 9/1998 | Forrest | 166/267 |
| 5,964,293 A | 10/1999 | Chatterji et al. | 166/294 |
| 6,009,747 A | 1/2000 | Santos | 73/53.01 |
| 6,052,520 A | 4/2000 | Watts, III | 395/500.31 |
| 6,063,738 A | 5/2000 | Chatterji et al. | 507/269 |
| 6,089,318 A | 7/2000 | Laramay et al. | 166/293 |
| 6,247,358 B1 | 6/2001 | Santos | 73/152.11 |
| 6,422,325 B1 * | 7/2002 | Krieger | 175/50 |
| 6,609,067 B2 | 8/2003 | Tare et al. | 702/9 |
| 6,703,351 B2 | 3/2004 | Stowe, II et al. | 507/117 |
| 2004/0123985 A1 | 7/2004 | Whitfill et al. | 166/294 |

* cited by examiner

METHOD FOR ENHANCING THE STABILITY OF A WATER SENSITIVE, REACTIVE SUBTERRANEAN FORMATION

This Application is a Divisional of Ser. No. 10/298,251 filed on Nov. 15, 2002

BACKGROUND OF THE INVENTION

The current invention relates to a method for enhancing formation stability during well construction. The method of the current invention improves the process of formulating cementing fluids (flushes, spacers, and cement slurries) such that the fluids reduce the risk of formation instability during well completion operations. More specifically, the current invention relates to a test for determining the optimum cementing fluid formulation for use in water sensitive, reactive formations.

Water sensitive, reactive formations include but are not limited to marl, clay bearing sandstone, clay bearing carbonates, shale stringers in salt formations and carbonate formations. Shales are among the most commonly encountered formations. Shales are fine-grained sedimentary rocks composed of clay, silt and in some cases fine sands. For the purpose of this discussion, shale will be termed as a loosely defined heterogeneous argillaceous material ranging from clay-rich gumbo (relatively weak) to shaly siltstone (highly cemented), with the common characteristic of having an extremely low permeability and contains clay minerals. Argillaceous formations like shales make up over 75 percent of drilled formations and cause over 90 percent of wellbore instability problems. Instability in shales is a continuing problem that results in substantial annual expenditure by the petroleum industry—in excess of a billion dollars according to conservative estimates.

A drilling fluid system (drilling mud) is an essential part of a conventional drilling process and consists of different solid and fluid components. When interacting with subterranean formation material such as shale and other water-sensitive, reactive formations, cementing fluids exhibit many of the same physical and chemical functionalities and properties as drilling mud. Different performance enhancing components may be added to any of these fluids. As known to those skilled in the art, the primary functions of a drilling fluid include the removal of rock material during drilling, imparting hydraulic support to the borehole to help ensure stability, providing lubrication to reduce friction between the borehole surface and drill pipe, cooling the drill bit, etc. Cementing preflushes and spacers serve the function of removing the drilling fluid in preparation for the cement slurry, as well as separating potentially incompatible drilling fluids from cement slurries. Finally, the cement will serve the ultimate function of zonal isolation and structural support. In each instance, the properties of these fluids are adjusted to account for the changing characteristics of wellbore formations encountered.

Cementing fluids often include several different salts (e.g. NaCl, KCl, and $CaCl_2$) for various purposes such as intentionally affecting (shortening) slurry set times, cementing across salt formations, and supposed protection of productive formations that may contain water-sensitive clays. Historically, salt content in cement slurries has varied from one or two percent to saturation with NaCl. Use of KCl and $CaCl_2$ is usually limited to no more than three or four percent. Further, seawater or brine is frequently added at the wellbore location to the cement composition as makeup water to produce a cement slurry having a suitable density and pumpability.

However, the use of salts in cement slurries has not been consistent with respect to formation issues. The position is frequently taken that the high pH of cement slurry, along with its minimal amount of calcium in solution, will suffice to provide formation protection in most cases. However, very little actual supporting evidence for this assumption has been found. Further, most testing reported in the literature has been based on regained permeability testing of sandstone cores. Although very meaningful to the understanding of that specific issue, any connection between effects on clays in permeable sandstones and formation instability as related to shales is complicated by precipitation of various calcium salt species from cement slurries. The pros and cons of this issue are frequently debated with no clear outcome. When salts are applied, presumably for formation stability purposes, it is frequently done without a true understanding of the method or outcome. Additionally, use of salts specifically in cementing spacers and preflushes is seldom applied.

In addition to salts, there are many other additives in cementing fluids. Polymers of many types (e.g. blends containing HEC, CMHEC, and various synthetic polymers) as well as silicates are a frequent component in cement slurries. They serve several functions including prevention of slurry dehydration and annular bridging during placement, enhanced bonding across permeable zones, rheology adjustment, and as an aid to gas migration control. However, combining salts and fluid loss additives in the same slurry frequently presents a more complicated and costly scenario because many fluid loss additives do not hydrate and/or otherwise function as efficiently in the presence of high concentrations of soluble salts. This cost-driven approach to achieving cement slurry fluid loss values has resulted in the reduction and general elimination of salts in most primary cementing slurries without a true understanding of the resulting effects on wellbore stability.

Thus, a need exists for a method of accurately formulating cementing fluids which will enhance formation stability.

SUMMARY OF THE INVENTION

The current invention provides a method for enhancing subterranean formation stability. In particular, the current invention is directed to a method for enhancing the stability of water-sensitive, reactive subterranean formations. According to the method of the current invention, a sample of the targeted subterranean formation or a similar subterranean formation is obtained and placed in a testing device. The sample is placed under a confining pressure approximately equal to the pressure encountered in the subterranean formation. The confining pressure will be maintained on the sample for the duration of the test procedure. Additionally, back-pressure is applied on the upstream side of the sample by a fluid similar to the fluid present in the pores of the subterranean formation. Subsequently, the back-pressure is released and the sample allowed to consolidate. Following consolidation, upstream pressure is applied to the sample while monitoring the downstream pressure exerted by the shale sample. Once the downstream pressure has increased by at least 50 percent, the upstream pressure is removed. The downstream and upstream pressures are monitored and allowed to equilibrate or at least stabilize. Thereafter, upstream pressure is again applied to the sample by pumping a cementing fluid through the testing device. As the cementing fluid contacts and applies pressure to the sample, the change in downstream pressure is measured. The water activity of the cementing fluid is adjusted in response to the change in downstream pressure to provide an economical cementing fluid formulation having a positive stability enhancing impact on the subterranean formation.

The current invention also provides a method for formulating cementing fluids to be used in a wellbore penetrating a water-sensitive, reactive subterranean formation. The method of the current invention provides cementing fluids formulated to reduce or eliminate the likelihood of formation instability during the cementing process. According to the method of the current invention, a sample of the targeted subterranean formation or formation of similar composition is obtained and placed under a confining pressure in a suitable testing device. Using a fluid similar to formation pore fluid (simulated pore fluid), back-pressure approximating the in situ pore pressure of the formation is applied to the sample. Thereafter, removing the back-pressure while maintaining the confining pressure consolidates the sample. Subsequently, upstream pressure is applied to the sample using the simulated pore fluid while monitoring the downstream pressure. Once the downstream pressure has increased by at least 50 percent, the upstream pressure is removed and the upstream and downstream pressures are allowed to approximately equilibrate. Following stabilization of the upstream and downstream pressures, upstream pressure is once again applied to the sample using a cementing fluid. During the application of upstream pressure, the change in downstream pressure is measured. In response to the change in downstream pressure, the water activity of the cementing fluid may be increased or decreased. The process steps of applying upstream pressure, measuring the change in downstream pressure and adjusting the water activity of the cementing fluid are repeated until the downstream pressure is less than or equal to the upstream pressure. Preferably, the downstream pressure is less than the upstream pressure.

Additionally, the current invention provides a method for enhancing the stability of a water sensitive, reactive formation penetrated by a wellbore during the cementing process. The method of the current invention comprises formulating cementing fluids having low water activity levels and capable of applying an osmotic semi-permeable membrane on the face of the formation. According to the method of the current invention, a sample of the targeted subterranean formation or formation of similar composition is obtained and placed under a confining pressure in a suitable testing device. Using a fluid similar to formation pore fluid (simulated pore fluid), back-pressure approximating the in situ pore pressure of the formation is applied to the sample. Thereafter, removing the back-pressure while maintaining the confining pressure consolidates the sample. Subsequently, upstream pressure is applied to the sample using the simulated pore fluid while monitoring the downstream pressure. Once the downstream pressure has increased by at least 50 percent, the upstream pressure is removed and the upstream and downstream pressures are allowed to approximately equilibrate. Following stabilization of the upstream and downstream pressures, upstream pressure is once again applied to the sample using a cementing fluid. During the application of upstream pressure, the change in downstream pressure is measured. In response to the change in downstream pressure, the water activity of the cementing fluid may be increased or decreased. Additionally, prior to or during the cementing operation, an osmotic semi-permeable membrane is applied to the face of the subterranean water sensitive, reactive formation.

DETAILED DISCLOSURE OF THE INVENTION

The current invention relates to methods for enhancing the stability of water-sensitive, reactive formations such as shale formations and to methods for accurately formulating cementing fluids. Those skilled in the art are familiar with the benefits of incorporating various salts and other compounds into the formulations of cementing fluids to limit the detrimental effects of such fluids on formation stability. However, prior to the current invention, the process of formulating the cementing fluids was one of "trial and error." The current invention provides an accurate method for simulating the downhole environment of the subterranean formation including the impact of cementing fluids on the subterranean formation. By assessing the impact of cementing fluids on the subterranean formation, the current invention provides methods for enhancing formation stability and improved methods for formulating cementing fluids.

One critical aspect of maintaining formation stability is the balancing of fluid pressure within the pores of the formation, known as pore pressure, by the fluid pressure within the borehole, known as borehole pressure. Thus, the transport of water between the borehole and the formation directly impacts the stability of the formation. In general, the two most relevant mechanisms for water transport in and out of shale and other water sensitive formations are: (1) the hydraulic pressure difference between the wellbore pressure (equivalent total fluid column density) and the formation pore pressure; and, (2) the chemical potential difference, i.e., water activity, between the wellbore fluid and the pore fluid within the formation. Accordingly, it is desirable to control the flow of water from the wellbore into and out of the formation in order to maintain formation stability.

As will be discussed herein, the current invention utilizes two primary methods for controlling the flow of water into and out of the formation. First, the current invention provides a method for formulating cementing fluids preferably having a water activity lower than the water activity of the pore fluid within the formation. Second, the current invention additionally provides for the generation of an osmotic, semi-permeable membrane on the face of the formation.

If the cementing fluids have a higher water activity level than the pore fluid within the formation, then water will flow from the wellbore into the pores of the formation. As water enters the formation pores, formation pore pressure increases ultimately leading to formation instability. However, if cementing fluids are formulated with a water activity level less than the water activity level of the pore fluids, then water will flow outwards from the formation into the wellbore. The outward flow of water from the formation effectively increases the fluid pressure within the wellbore thereby further stabilizing the formation. Thus, knowledge of the chemical potential of the cementing fluids, i.e., water activity, and the impact of that potential on the formation permits the formulation of cementing fluids that will enhance wellbore stability.

Figure 1:
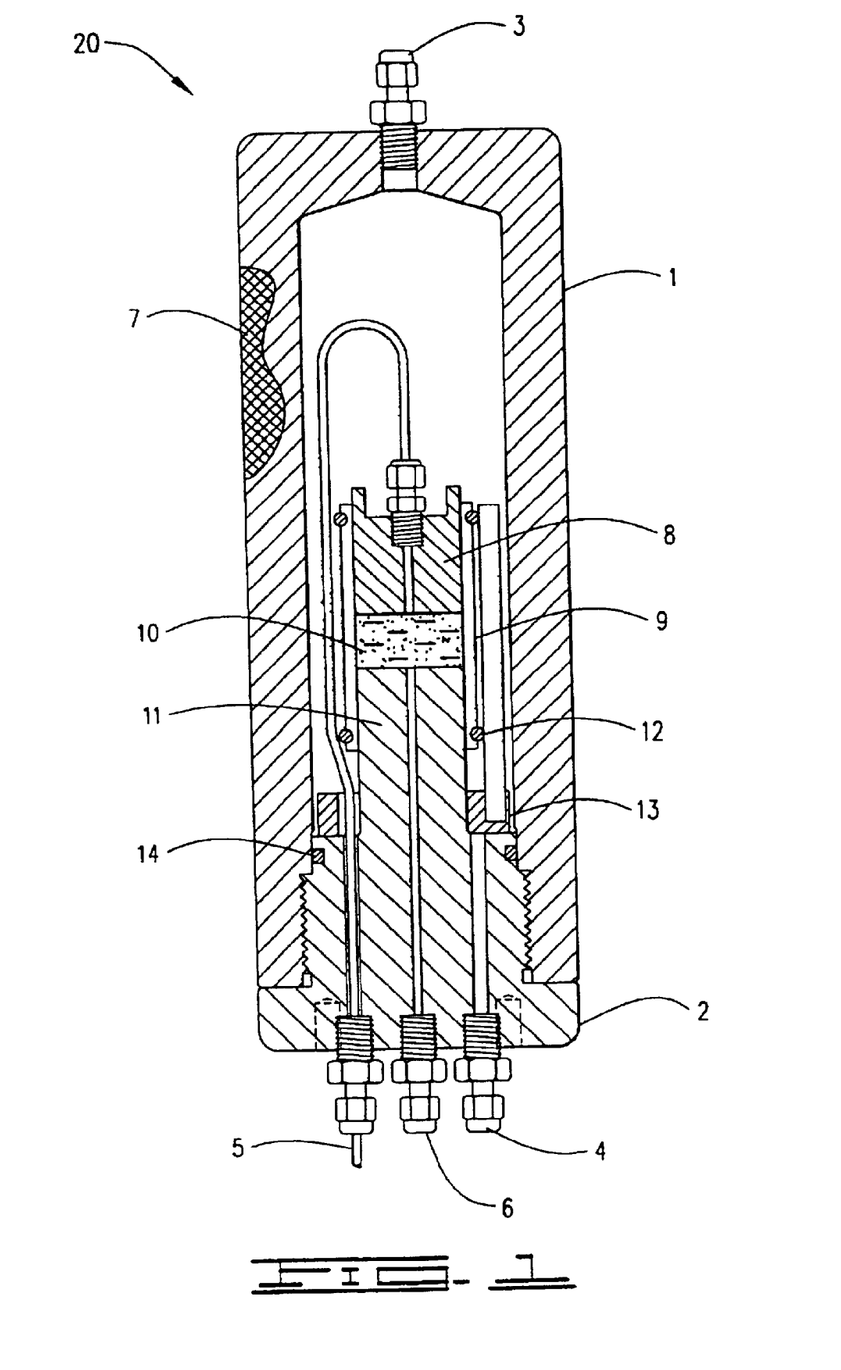
FIG. 1 is a schematic representation of the test cell used in the methods of the current invention.

As noted above, one aspect of the current invention is a method of formulating cementing fluids capable of enhancing the stability of water sensitive, reactive formations. The method of formulating the cementing fluids utilizes a testing device such as depicted in FIG. 1 to simulate the downhole environment of the targeted formation. The testing device of FIG. 1 was previously disclosed in PCT Application No. WO 02/053873, published on Jul. 11, 2002 and assigned to the assignee of the current invention, and in the paper entitled "Development of Novel Membrane Efficient Water-Based Drilling Fluids Through Fundamental Understanding of Osmotic Membrane Generation in Shales," by Fersheed K. Mody, Uday A. Tare, Chee P. Tan, Calum J. Drummond, and Bailin Wu, presented at the SPE Annual Technical Conference and Exhibition held in San Antonio, Tex., October 2002. Both references are incorporated herein by reference.

The method of formulating cementing fluids will be described with reference to the testing device 20 of FIG. 1. Referring to FIG. 1, the parts of the cell are shown as follows: Cell—1; Base—2; Bleed Port—3; Confining Fluid Port—4; Downstream Pressure Line (pore fluid)—5; Upstream Pressure Line (test solution)—6; Knurl—7; Top Platen—8; Membrane—9; Sample—10; Bottom Platen—11; O-Rings—12; Collar—13; and Seal—14. As shown in FIG. 1, only a single cell 1 is depicted; however, the testing device actually has six test cells. Thus, six different formulations may be tested under simulated downhole pressure conditions at any one time while independently controlling each individual test cell 1.

Device 20 of FIG. 1 has a confining pressure and pore pressure capacity of 35 MPa and 20 MPa respectively. The confining pressure is applied with a pump incorporating an accumulator (not shown) and controlled with a high precision stepping motor pump control system (not shown). This system is able to control the confining pressure to within ±7 kPa of the target pressure. Each test cell 1 has an associated test solution cylinder (not shown), therefore up to six different test solutions can be tested simultaneously. This configuration also provides independent control of each test start and termination. Two pore fluid cylinders (not shown) are provided to avoid interruption to the tests when the fluid runs out by switching from one cylinder to the other. Separate high-pressure gas cylinders (not shown) provide the upstream pressure, i.e. borehole pressure resulting from the cementing fluid, and downstream pressure, resulting from the pore fluid. A single pressure transducer (not shown) monitors the upstream pressure of the six test cells 1 while a separate pressure transducer (not shown) monitors the downstream pressure of each cell 1. Circulation of the cementing fluid is adjusted with the dial gauge of a metering valve (not shown) at the upstream end of each cell. The entire device is placed in a constant temperature facility (not shown) to control and maintain constant test temperature.

For the purposes of the following description of the cementing fluid testing procedure, the term "downstream pressure" corresponds to the pore pressure exerted by the targeted formation. The term "confining pressure" refers to the in situ pressure applied to the overall formation. The term "upstream pressure" corresponds to the hydrostatic pressure exerted by fluids within the borehole. The term "back pressure" corresponds to the pore pressure of the formation as applied to the face of sample 10 during back-pressure saturation. Back-pressure saturation is a step carried out to restore formation pore pressure and ensure complete saturation of sample 10 with the simulated pore fluid. The following test procedure is used to evaluate the impact of cementing fluids on the pore pressure of the formation:

1. Sample mounting—sample 10, obtained from the targeted formation or a similar formation, is placed within test cell 1 between the platens 8 and 11. Sample 10 is jacketed in a membrane 9, O-rings 12 are mounted over membrane 9 on platens 8 and 11 and cell 1 is filled with a simulated pore fluid.

2. Back-pressure Saturation—This step places sample 10 under a pressure corresponding to the in situ formation pressure. Typically, a confining pressure is applied to the sample while back-pressure is applied to the upstream side of sample 10. During this step, the downstream pressure will increase to a pressure typically greater than the back-pressure applied. The confining pressure is initiated at the beginning of the test and maintained for the duration of the test.

3. Consolidation—The excess fluid/pressure is allowed to drain/dissipate and sample 10 is assumed to be essentially consolidated when the change in the downstream pressure is less than 50 kPa/hour.

4. Pore Fluid Pressure Transmission—Upon consolidation of sample 10, increase the upstream pressure, applied by using the simulated pore fluid to apply a pressure approximately equal to the equivalent circulating density of the borehole fluid during cementing operations at the face of the targeted formation, i.e. this step simulates the downhole pressure experienced by the formation. When the downstream pressure increases by more than 50 percent, reduce the upstream pressure back to sample consolidation pore pressure.

5. Re-consolidation—Allow the excess pore pressure inside the sample to dissipate such that the upstream and downstream pressures equilibrate or at least stabilize.

6. Test Solution Pressure Transmission—Following the equilibration of the downstream pressure with the upstream pressure (or stabilization of the downstream pressure), displace the simulated pore fluid in upstream line 6 with the test solution, i.e. the cementing fluid. Ensure that the volume of cementing fluid pumped is at least twice the volume of pore fluid in the line and upstream platen. Increase the upstream pressure to approximate the pressure exerted by the cementing fluids on the face of the targeted formation during cementing operations. Allow the downstream pressure to increase and stabilize.

7. Displacement of Test Solution with Lower Activity Solution—Following the equilibration of the downstream pressure with the upstream pressure (or stabilization of the downstream pressure), displace the cementing fluids with a cementing fluid having a lower water activity level.

8. Monitor the change in downstream pressure to determine if the water activity level of the cementing fluid will enhance formation stability.

9. Continue circulation and monitor downstream pressure. Note the maximum increase or decrease in downstream pressure. The maximum pressure change is considered to be test termination.

As will be demonstrated by way of the following examples, use of the foregoing method enables the formulation of cementing fluids suitable for enhancing the stability of the subterranean formation. Specifically, the foregoing method provides an accurate simulation of the downhole environment. Thus, the change in downstream pressure during testing of the cementing fluid in device 20 reflects the relative differences in water activity levels between the cementing fluid and the pore fluid. Accordingly, analysis of the test results will indicate whether or not the cementing fluid has a water activity level sufficiently low enough to enhance formation stability. If the downstream pressure is greater than the upstream pressure, then the water activity level of the cementing fluid must be lowered. Because this method reflects the downhole conditions of the wellbore, the water activity of the cementing fluid can be continually adjusted and re-tested until the desired activity is reached or no further adjustment is possible.

Adjustment of the water activity level of the cementing fluid is carried out by adding salts and other compounds to the cementing fluid. Preferred compounds for adjusting the water activity level of the cementing fluids include but are not limited to water-soluble salts of calcium, sodium, potassium, magnesium and the like, and glycols and like derivatives such as ethylene glycol, propylene glycol, and other compounds as known by those skilled in the art as being capable of reducing water activity levels.

If the water activity level of the cementing fluid can not be lowered further, then additional steps to protect the formation must be taken as described below. However, in many instances merely slowing the increase in pore pressure will suffice, as the cementing process will frequently be completed, including setting of the cement, prior to a detrimental increase in pore pressure.

If testing of the cementing fluid indicates that the pore pressure cannot be lowered or if the increase in pore pressure is not sufficiently retarded to protect the stability of the subterranean formation, then additional steps must be taken to preserve the integrity of the formation. One means available for further enhancing the stability of the formation is the generation of an osmotic membrane on the face of the formation penetrated by the wellbore. The methods of generating such membranes and the effectiveness of such membranes are known to those skilled in the art as demonstrated by the paper entitled "Development of Novel Membrane Efficient Water-Based Drilling Fluids Through Fundamental Understanding of Osmotic Membrane Generation in Shales," by Fersheed K. Mody, Uday A. Tare, Chee P. Tan, Calum J. Drummond, and Bailin Wu, presented at the SPE Annual Technical Conference and Exhibition held in San Antonio, Tex., October 2002 and by published PCT Application No. WO 02/053873, published on Jul. 11, 2002 and assigned to the assignee of this invention. Both references are incorporated herein by reference.

Thus, the generation of an efficient semi-permeable membrane will help ensure adequate outflow of water from the formation or at least minimize the flow of water into the formation due to wellbore pressure. Incorporating additives known to those skilled in the art into the cementing fluid formulation can increase the efficiency of the semi-permeable membrane. For example, the following non-limiting list of additives if applied correctly may increase the efficiency of a semi-permeable membrane formed on the face of a shale formation: electrolytes, phenols, tetra methylammonium laurate, tetra methylammonium oleate, silicic acid, potassium methyl siliconate, sodium methyle siliciconate, biopolymers, hydroxethyl cellulose, sodium carboxylmethyl-hydroxethyl cellulose, synthetics such as polyethylene amines, copolymers of 2-acrylamide-2-methyl propane sulfonic acid and N-vinyl-N-methyl acetamide, HALAD-344 (a random copolymer of 2-acrylamide-2-propane sulfonic acid and N,N-dimethyl acrylamide), HALAD-413 (a caustized lignite grafted with 2-acrylamide-2-methylsulfonic acid, N,N-dimethylacrylamide, and acrylamide), latexes such as polyvinylalochol and styrene butadiene, and silicate compounds such as sodium silicate and potassium silicate.

The following examples are provided merely to enhance the understanding of the current invention and are not considered limiting with regard to the scope of the invention. Example 1 demonstrates how variations in concentration influence pore pressure. Examples 2–6 demonstrate the use of the testing method described above as a means for evaluating the impact of a compound on pore pressure. The following fluids were tested according to the foregoing method:

Fluid A—a cement filtrate produced by mixing API Class H Portland cement with approximately 38% fresh water and extracting said filtrate from said slurry in accordance with API Recommended Practice 10B, 22nd edition, December 1997.

Fluid C—a preparation of a solids-free solution to simulate the filtrate of a cementing spacer commercially available from Halliburton Energy Services as Tuned Spacer.

Fluid D.—a preparation of a sodium silicate cementing fluid composed of 50% (by volume) fresh water and 50% (by volume) commercially-available, 40% active sodium silicate.

Simulated Pore Fluid—water containing the following dissolved salts:

| Salt | Concentration (g/l) |
|---|---|
| $NaHCO_3$ | 15.6 |
| $Na_2SO_4$ | 7.3 |
| NaCl | 3.86 |
| $Na_2CO_3$ | 3.30 |
| $MgSO_4$ | 0.62 |
| $CaSO_4$ | 0.42 |

EXAMPLE 1

Figure 2:
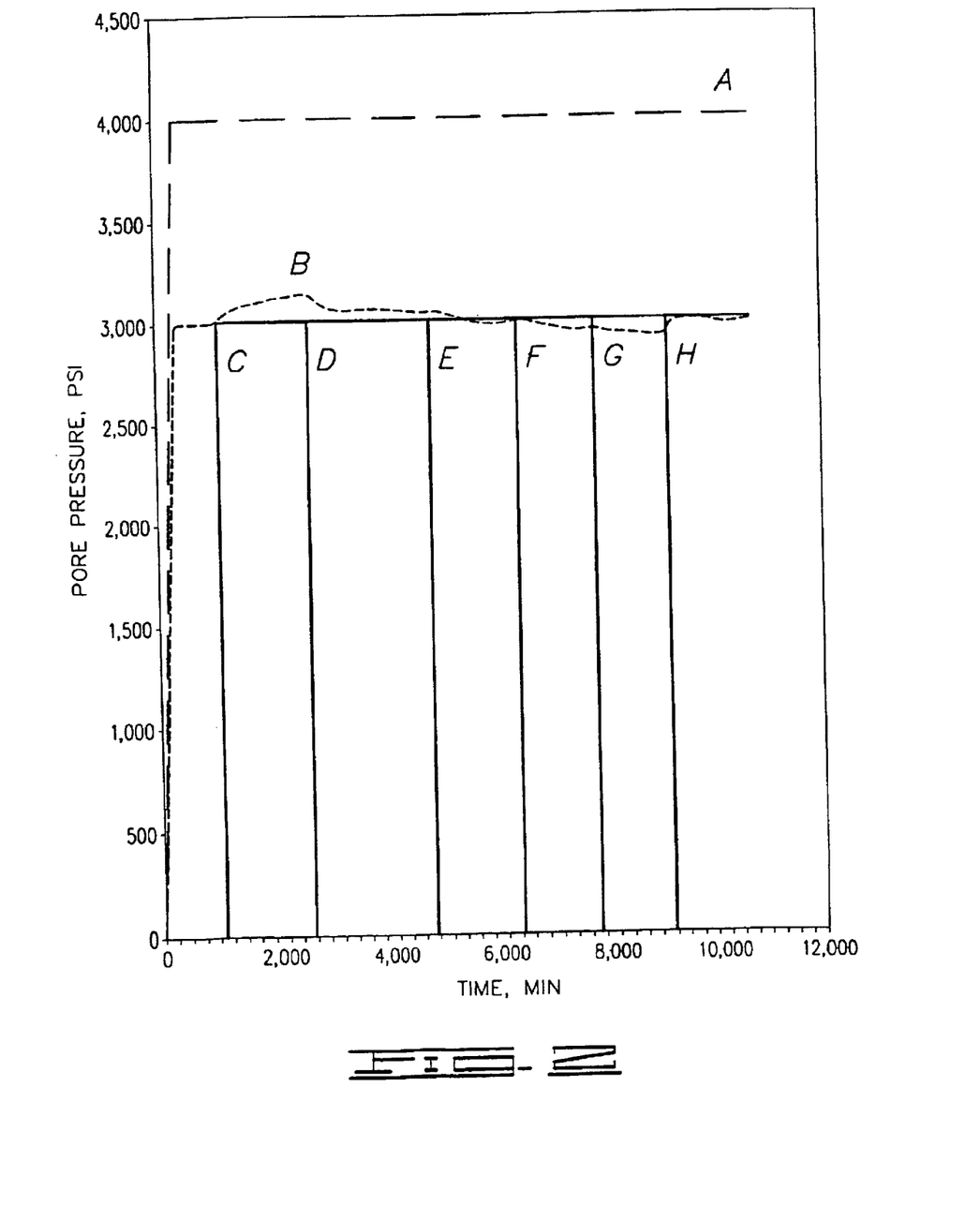
FIG. 2 graphically represents the influence of various concentrations of KCl on pore pressure.

With reference to FIG. 2, Example 1 demonstrates how variations in salt content can influence pore pressure. In this example, a sample of shale was stabilized with a solution of 8% NaCl. The sample was placed under a confining pressure, represented by line A, of 27.6 MPa (4000 psi) and exposed to various concentrations of a KCl solution. The change in pore pressure was monitored and is represented in FIG. 2 as line B. The shale was exposed to the following concentrations of KCl solution as represented by lines C through G respectively: 1%, 4%, 8%, 15% and 20%. The final solution contained 8% NaCl and is represented by line H. As reflected by line B, the pore pressure within the shale increased when exposed to the 1% and 4% solutions of KCl due to the net imbalance in salinity. The 8% KCl solution resulted in a gradual reduction of pore pressure to approximately that of the shale prior to exposure to any upstream fluid. The 15% and 20% KCl solutions demonstrate a clear reduction in pore pressure due to a net flux of water flowing out of the shale. Thus, use of a cementing fluid having a water activity level approximating the water activity level of the 8% KCl solution should not damage a downhole formation similar in structure and composition to the structure of the shale sample tested. Finally, when exposed to the 8% NaCl solution, the pore pressure returned to the equilibrium pressure. This Example demonstrates the ability to accurately test pore pressure within a shale sample and the ability to adjust the salt content of a fluid in order to enhance wellbore stability.

EXAMPLES 2–5

For Examples 2–5, FIGS. 3–6 depict the variation in both upstream and downstream pressures, as represented by lines B and C respectively, during performance of the testing method described above. The confining pressure applied to the shale sample is represented by line A. The temperature of the test cell is represented by line D.

The initial increase in downstream pressure reflects the performance of the Back-pressure Saturation step. The drop in pressure represents the subsequent Consolidation step. Thereafter, changes in downstream pressure are influenced by the application of upstream pressure to the shale sample. On about day 2 of each test, upstream pressure (Pore Fluid Pressure Transmission) is applied to the sample. This increase in upstream pressure reflects the expected pressure to be applied by the cementing fluid in the downhole environment. This pressure is removed and the sample allowed to re-consolidate as reflected by the drop in pressured depicted by both lines B and C. Following reconsolidation, the sample is ready for testing by applying pressure with a cementing fluid.

The upstream pressure applied with the cementing fluid reflects the expected borehole pressure during a cementing operation. If the downstream pressure corresponds to the upstream pressure, as in FIGS. 3, 4, 5 and 6, then a cementing fluid having a different water activity level is substituted for the upstream fluid. The change in downstream pressure following the change in upstream fluid reflects the impact the fluid will have on formation stability. If the downstream pressure decreases, then the fluid should have a stabilizing effect. Alternatively, if the rate of increase in downstream pressure is at least slowed then the fluid may preserve the formation for a period of time sufficient to complete the cementing operations.

As used in the examples 2–5, the term KCl reflects the addition of sufficient KCl to the cementing fluid to yield a 5% KCl solution based on the weight of the water used to make up the cementing fluid.

Figure 3:
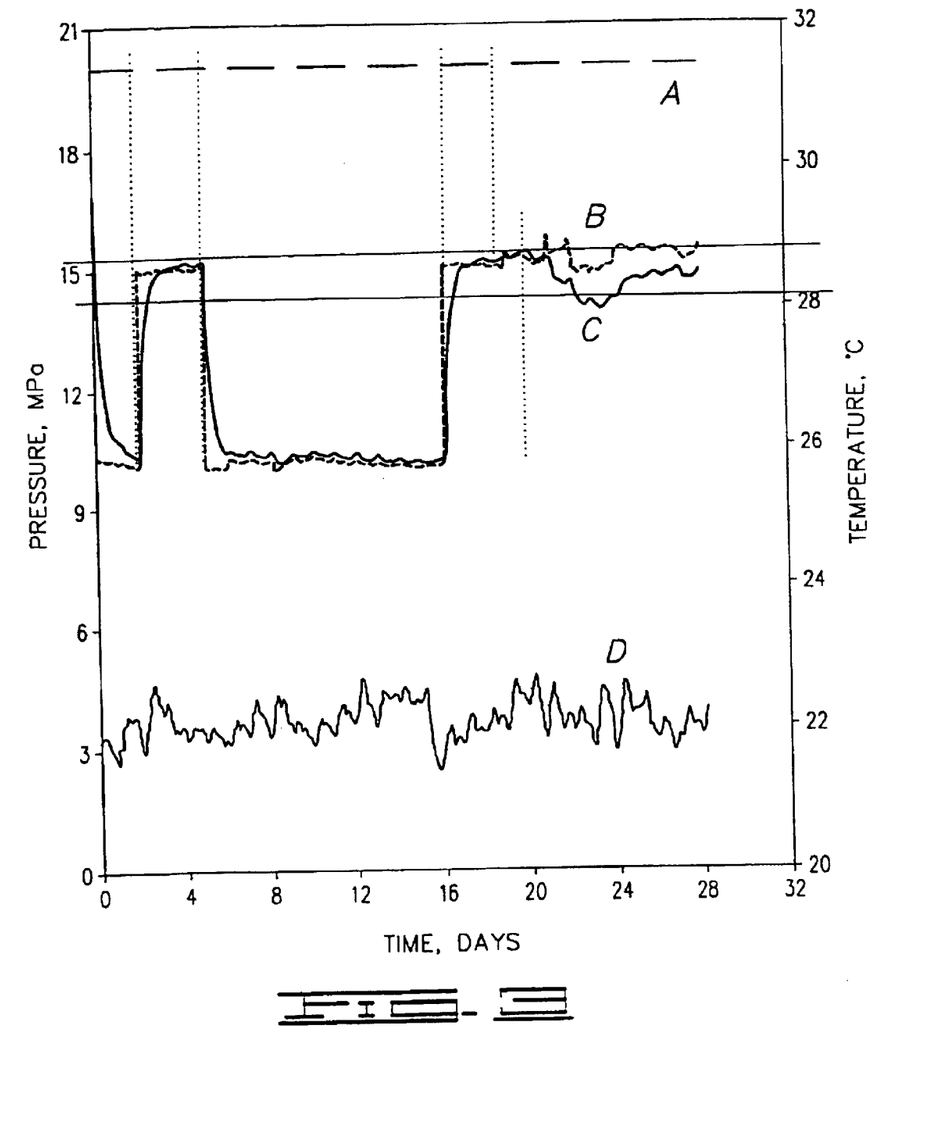
FIGS. 3–6 graphically represent the influence of various additives on pore pressure during performance of the testing method of the current invention.

Example 2, as shown in FIG. 3, demonstrates that the addition of KCl to Fluid C will produce a drop in downstream pressure. Therefore, a cementing fluid comprising Fluid C and KCl should have a stabilizing effect on a water sensitive, reactive formation during cementing operations.

Figure 4:
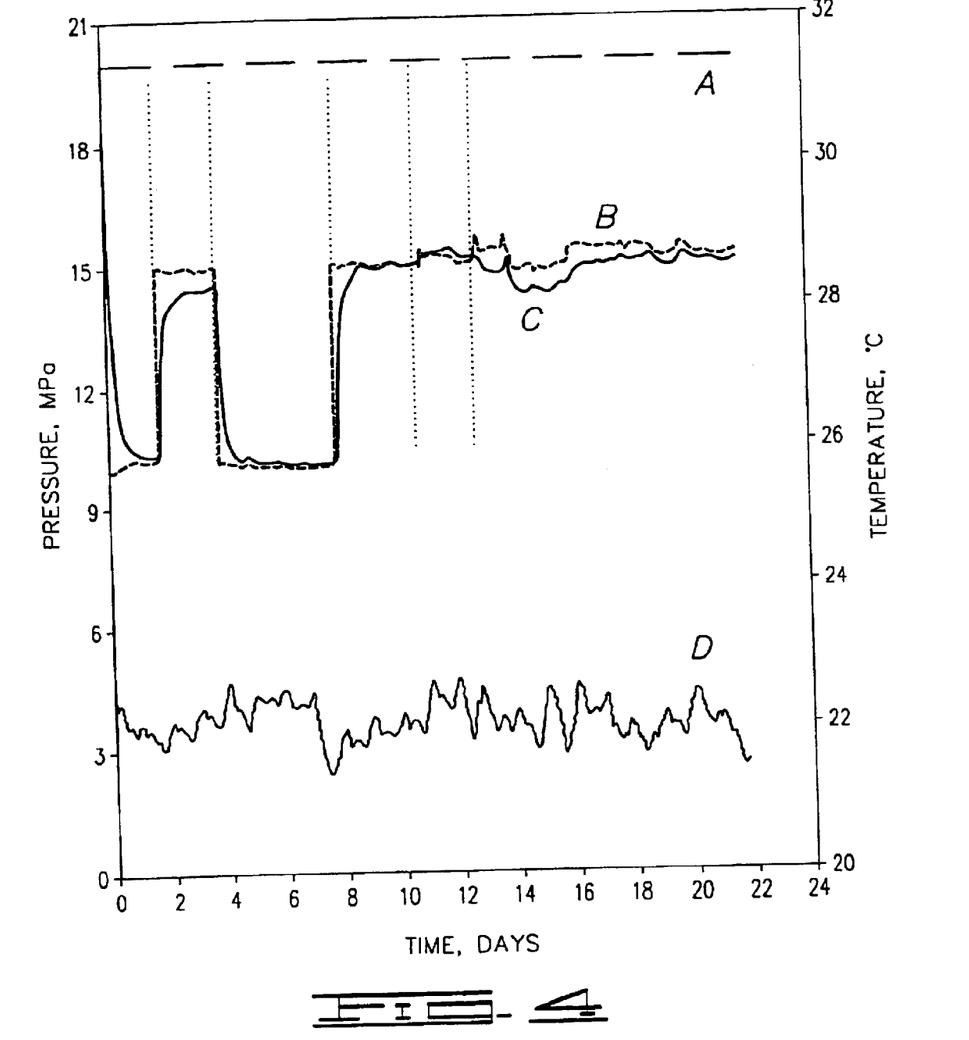

Example 3, as shown in FIG. 4, reflects the use of Fluid A with and without KCl. The results of this test would indicate that Fluid A with KCl produces a temporary decrease in formation pore pressure with a gradual increase in pressure overtime. Therefore, this test demonstrates the ability to predict the gradual increase in formation pore pressure. As a result, the cementing operations should be completed prior to a detrimental increase in formation pore pressure.

Figure 5:
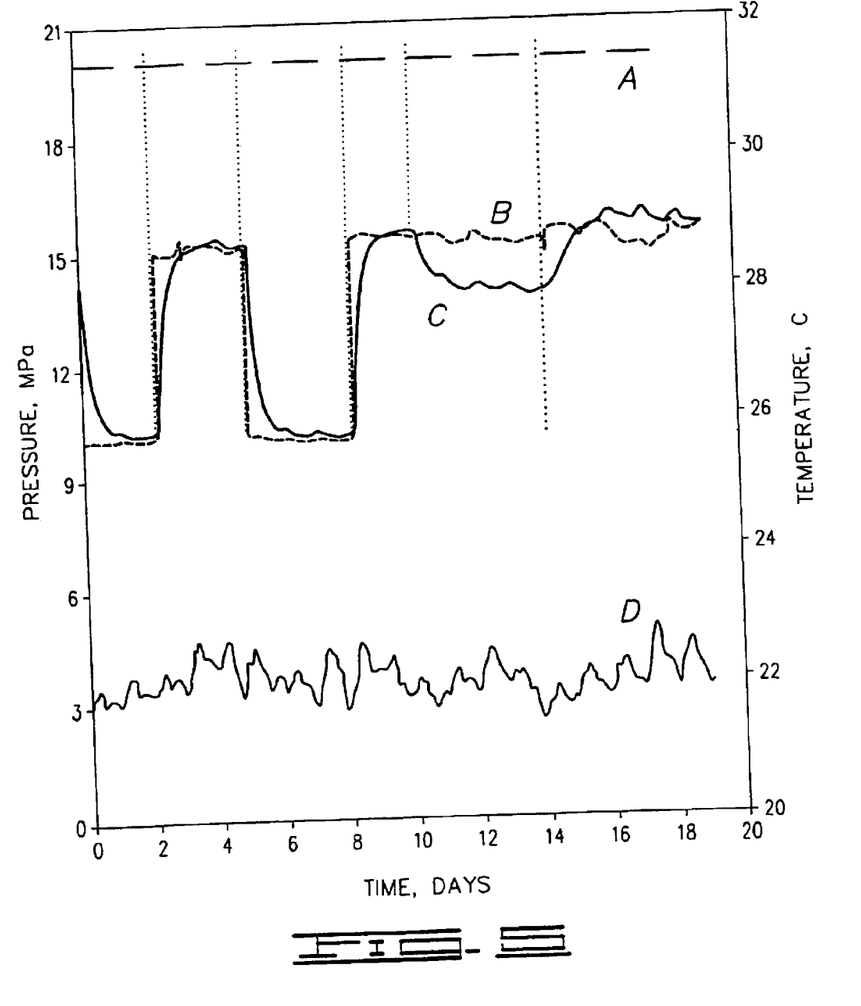

Example 4, depicted by FIG. 5, reflects the potential impact of changing fluids during a cementing operation. This test may explain why certain formation remain stable for a portion of a cementing operation and subsequently destabilizes at a later stage. As reflected by FIG. 5, Fluid D produces a drop in downstream pressure reflecting the drop in pore pressure within the sample. However, upon the addition of water the pore pressure spikes and continues to increase upon the subsequent addition of Fluid A. Thus, with information of this nature, one conducting a cementing operation will be able to predict the impact of changing fluids during the operation.

Figure 6:
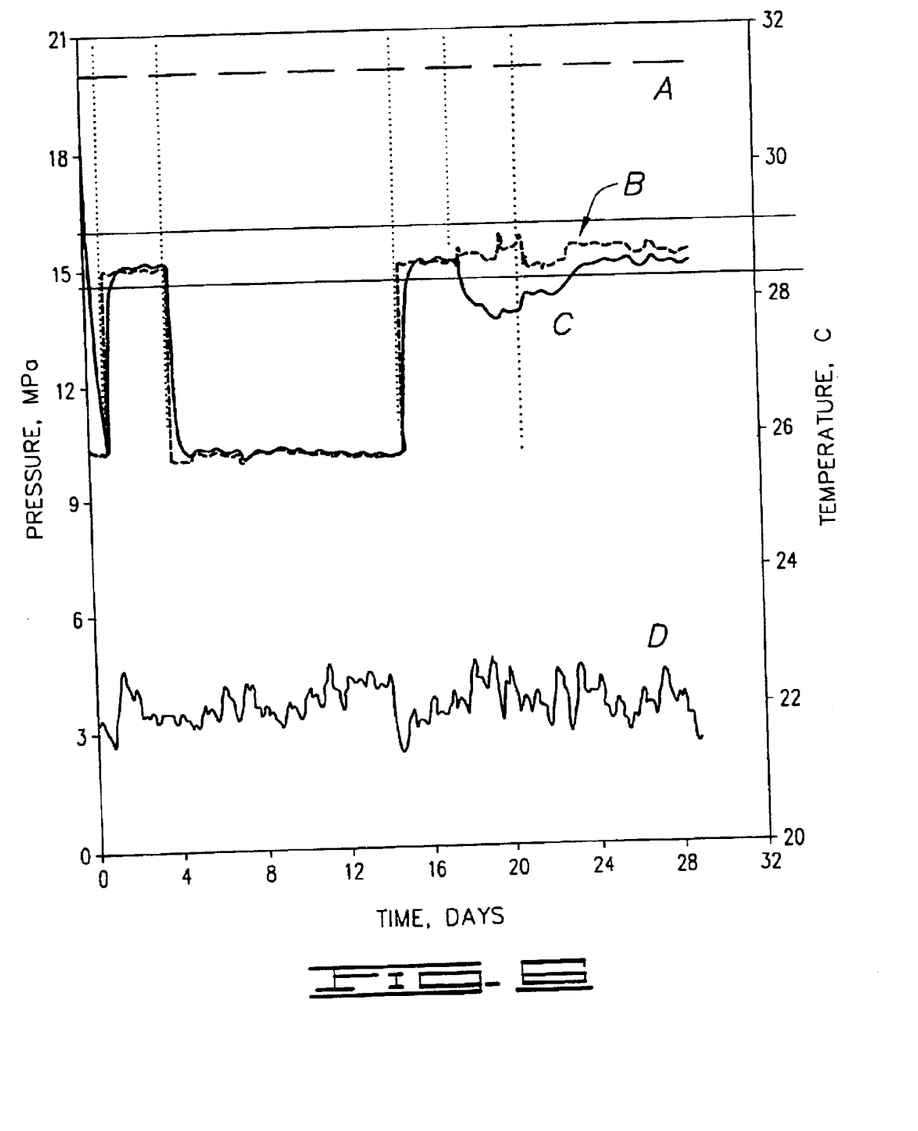

Example 5, as shown in FIG. 6, is a repeat of the test of Example 4; however, in this instance Fluid A also contains KCl. Although not readily visible in the FIG. the exposure of the sample to water once again resulted in a jump in pore pressure. However, displacement of the water spacer with Fluid A containing KCl stabilized the pore pressure for several days. Subsequently, the upward trend in pore pressure resumed. However, the elapsed time should be sufficient to complete the cementing process including setting of the cement.

Thus, the current invention provides a valuable testing method for determining the impact of cementing fluids on water sensitive, reactive formations. The current invention further provides the ability to formulate cementing fluids which will enhance the stability of such formations. Additionally, the current invention provides methods for enhancing formation stability of water sensitive, reactive formation penetrated by a wellbore during cementing operations.

While the present invention has been described in detail with reference to FIGS. 1–6 and the examples, other embodiments of the device and methods for performing the current invention will be apparent to those skilled in the art. Thus, the foregoing specification is considered exemplary with the true scope and spirit of the invention being indicated by the following claims.

What is claimed is:
1. A method for enhancing the stability of a water sensitive, reactive subterranean formation comprising adjusting the water activity of a cementing fluid in relation to the water activity level of pore fluids found within said formation such that the cementing fluid has a water activity equal to or lower than the water activity of the pore fluids.

2. The method of claim 1, wherein the water activity level of the cementing fluid is adjusted by adding ethylene glycol, propylene glycol, a water soluble salt of calcium, a water soluble salt of sodium, a water soluble salt of potassium, a water soluble salt of magnesium, or mixtures thereof.

3. The method of claim 1, wherein the cementing fluid is a flush.

4. The method of claim 1, wherein the cementing fluid is a spacer.

5. The method of claim 1, wherein the cementing fluid is a cement slurry.

6. The method of claim 1, further comprising the steps of:
 a) obtaining a subterranean formation sample from the targeted formation or a formation of similar composition;
 b) placing the sample under a confining pressure;
 c) applying back-pressure to the sample;
 d) consolidating the sample by maintaining the confining pressure while releasing the back-pressure from the sample;
 e) applying upstream pressure to the sample while monitoring the downstream pressure exerted by the sample;
 f) removing the upstream pressure once the downstream pressure has increased by at least 50 percent;
 g) allowing the upstream and downstream pressures to approximately equilibrate;
 h) using a cementing fluid to apply upstream pressure to the sample;
 i) monitoring and measuring the change in downstream pressure versus upstream pressure in response to the application of upstream pressure by the cementing fluid; and,
 j) determining the relative difference in water activity level between the pore fluid and the cementing fluid.

7. A method for enhancing the stability of a water sensitive, reactive subterranean formation penetrated by a borehole comprising the steps of:
 determining the water activity of fluid found within the formation;

preparing a cementing fluid having a water activity less than the water activity of the pore fluid found within the formation; and, placing the cementing fluid into the borehole penetrating the formation.

8. The method of claim 7, wherein said step of preparing a cementing fluid includes the addition of a water activity adjusting compound selected from the group consisting of ethylene glycol, propylene glycol, a water soluble salt of calcium, a water soluble salt of sodium, a water soluble salt of potassium, a water soluble salt of magnesium, or mixtures thereof.

9. The method of claim 7, further comprising determining the relative difference in water activity level between the pore fluid and the cementing fluid.

10. The method of claim 9, further comprising the steps of:
 a) obtaining a subterranean formation sample from the targeted formation or a formation of similar composition;
 b) placing the sample under a confining pressure;
 c) applying back-pressure to the sample;
 d) consolidating the sample by maintaining the confining pressure while releasing the back-pressure from the sample;
 e) applying upstream pressure to the sample while monitoring the downstream pressure exerted by the sample;
 f) removing the upstream pressure once the downstream pressure has increased by at least 50 percent;
 g) allowing the upstream and downstream pressures to approximately equilibrate;
 h) using a cementing fluid to apply upstream pressure to the sample;
 i) monitoring and measuring the change in downstream pressure versus upstream pressure in response to the application of upstream pressure by the cementing fluid; and,
 j) determining the relative difference in water activity level between the pore fluid and the cementing fluid.

11. The method of claim 7, further comprising the step of generating an osmotic semi-permeable membrane on the face of the formation penetrated by the wellbore.

12. The method of claim 7, wherein the cementing fluid is a flush.

13. The method of claim 7, wherein the cementing fluid is a spacer.

14. The method of claim 7, wherein the cementing fluid is a cement slurry.

15. A method for enhancing the stability of a water sensitive, reactive subterranean formation penetrated by a borehole comprising:
 determining the water activity of fluid found within the formation;

introducing into the borehole a cementing fluid having a water activity lower than the water activity of the fluid within the formation; and, forming an osmotic semi-permeable membrane on the face of the formation penetrated by the borehole.

16. The method of claim 15, further comprising determining the relative difference in water activity level between the pore fluid and the cementing fluid.

17. The method of claim 15, wherein said step of preparing a cementing fluid includes the addition of a water activity adjusting compound selected from the group consisting of ethylene glycol, propylene glycol, a water soluble salt of calcium, a water soluble salt of sodium, a water soluble salt of potassium, a water soluble salt of magnesium, or mixtures thereof.

18. The method of claim 17, further comprising the steps of:
 a) obtaining a subterranean formation sample from the targeted formation or a formation of similar composition;
 b) placing the sample under a confining pressure;
 c) applying back-pressure to the sample;
 d) consolidating the sample by maintaining the confining pressure while releasing the back-pressure from the sample;
 e) applying upstream pressure to the sample while monitoring the downstream pressure exerted by the sample;
 f) removing the upstream pressure once the downstream pressure has increased by at least 50 percent;
 g) allowing the upstream and downstream pressures to approximately equilibrate;
 h) using a cementing fluid to apply upstream pressure to the sample;
 i) monitoring and measuring the change in downstream pressure versus upstream pressure in response to the application of upstream pressure by the cementing fluid; and,
 j) determining the relative difference in water activity level between the pore fluid and the cementing fluid.

19. The method of claim 15, wherein the cementing fluid is a flush.

20. The method of claim 15, wherein the cementing fluid is a spacer.

21. The method of claim 15, wherein the cementing fluid is a cement slurry.

* * * * *